(12) United States Patent
Kong

(10) Patent No.: US 6,872,683 B2
(45) Date of Patent: Mar. 29, 2005

(54) METHOD FOR PREPARING CHELATED CATALYST FOR OLEFIN POLYMERIZATION

(75) Inventor: Gap-Goung Kong, Taejon (KR)

(73) Assignee: Samsung Atofina Co., Ltd., Chungnam (KR)

( * ) Notice: Subject to any disclaimer, the term of this patent is extended or adjusted under 35 U.S.C. 154(b) by 0 days.

(21) Appl. No.: 10/451,289

(22) PCT Filed: Dec. 22, 2000

(86) PCT No.: PCT/KR00/01521

§ 371 (c)(1),
(2), (4) Date: Nov. 3, 2003

(87) PCT Pub. No.: WO02/051882

PCT Pub. Date: Jul. 4, 2002

(65) Prior Publication Data

US 2004/0063573 A1 Apr. 1, 2004

(51) Int. Cl.$^7$ .............................. B01J 31/18; B01J 37/00

(52) U.S. Cl. ....................... 502/123; 502/115; 502/103; 526/348; 526/147; 526/124.3

(58) Field of Search .................................. 502/123, 115, 502/103; 526/348, 147, 124.3

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyoda et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,235,747 A | 11/1980 | Leung |
| 4,263,169 A | 4/1981 | Scata et al. |
| 4,277,372 A | 7/1981 | Matlack |
| 4,315,835 A | 2/1982 | Scata et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,384,983 A | 5/1983 | Hoff |
| 4,390,671 A | 6/1983 | Imai et al. |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,615,831 A | 10/1986 | Kanno et al. |
| 4,642,328 A | 2/1987 | Morterol et al. |
| 4,673,719 A | 6/1987 | Kioka et al. |
| 4,729,854 A | 3/1988 | Miyata et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |

(Continued)

FOREIGN PATENT DOCUMENTS

| | | |
|---|---|---|
| DE | 2553104 | 6/1977 |
| DE | 3636060 | 5/1988 |
| EP | 0131832 | 7/1984 |
| EP | 0350170 | 1/1990 |
| EP | 0385765 | 9/1990 |
| EP | 0602922 | 6/1994 |

(Continued)

OTHER PUBLICATIONS

Wen et al. "Mechanics of Fluidization" Chemical Engineerig Progress Symposium Series, 1962, vol. 62, 100–111.

Edelmann, "N–silylated benzamidines: versatile building blocks in main group and coordination chemistry," Coordination Chemistry Reviews, vol. 137, 1994, pp. 403–481.

(Continued)

*Primary Examiner*—Ling-Siu Choi
(74) *Attorney, Agent, or Firm*—Meyertons, Hood, Kivlin, Kowert & Goetzel, P.C.; Eric B. Meyertons

(57) ABSTRACT

The present invention provides a novel chelated catalyst for olefin polymerization and an olefin polymerization method using the chelated catalyst. The catalyst of the invention is a liquid titanium compound chelated with an imidazole ligand. The method for olefin polymerization of the present invention is performed using the liquid titanium compound as a main catalyst component.

2 Claims, No Drawings

U.S. PATENT DOCUMENTS

| | | |
|---|---|---|
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |
| 4,970,186 A | 11/1990 | Terano et al. |
| 4,978,648 A | 12/1990 | Barbe et al. |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,021,382 A | 6/1991 | Malpass, Jr. |
| 5,059,570 A | 10/1991 | Bailly et al. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,218,052 A | 6/1993 | Cohen et al. |
| 5,244,996 A | 9/1993 | Kawasaki et al. |
| 5,346,872 A | 9/1994 | Menon et al. |
| 5,419,116 A | 5/1995 | Rast et al. |
| 5,439,995 A | 8/1995 | Bailly et al. |
| 5,455,316 A | 10/1995 | Tsutsui et al. |
| 5,459,116 A | 10/1995 | Ro et al. |
| 5,498,770 A | 3/1996 | Hosaka et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,618,886 A | 4/1997 | Shinozaki et al. |
| 5,629,390 A | 5/1997 | Nishimura et al. |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,877,265 A | 3/1999 | Toida et al. |
| 5,880,056 A | 3/1999 | Tsutsui et al. |
| 5,936,049 A | 8/1999 | Kojoh et al. |
| 5,948,872 A | 9/1999 | Kioka et al. |
| 5,965,478 A | 10/1999 | Goto et al. |
| 5,968,862 A | 10/1999 | Abbott et al. |
| 6,028,149 A | 2/2000 | Luciani et al. |
| 6,034,025 A | 3/2000 | Yang et al. |
| 6,066,702 A | 5/2000 | Ro et al. |
| 6,111,038 A | 8/2000 | Kioka et al. |
| 6,114,276 A | 9/2000 | Kong et al. |
| 6,214,759 B1 | 4/2001 | Chang et al. |
| 6,218,331 B1 | 4/2001 | DiMaio et al. |
| 6,235,854 B1 | 5/2001 | Kioka et al. |
| 6,291,385 B1 | 9/2001 | Lee et al. |
| 6,323,150 B1 | 11/2001 | Kojoh et al. |
| 6,482,764 B1 | 11/2002 | Chang et al. |
| 6,521,560 B1 | 2/2003 | Kojoh et al. |
| 6,537,942 B2 | 3/2003 | Shinozaki et al. |
| 6,559,250 B2 | 5/2003 | Ro et al. |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Ro et al. |

FOREIGN PATENT DOCUMENTS

| | | |
|---|---|---|
| EP | 0606125 | 7/1994 |
| EP | 0607703 | 7/1994 |
| EP | 0669347 | 8/1995 |
| EP | 0391336 | 6/1999 |
| GB | 1335887 | 10/1973 |
| GB | 1492618 | 1/1975 |
| GB | 1577643 | 10/1980 |
| JP | 51136625 | 11/1976 |
| JP | 52111528 | 9/1977 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-191811 | 9/1988 |
| JP | 63-54004 | 10/1988 |
| JP | 63308003 | 12/1988 |
| JP | 01242605 | * 9/1989 |
| JP | 1242605 | 9/1989 |
| JP | 2240145 | 9/1990 |
| JP | 06-340711 | 5/1993 |
| JP | 05310824 | * 11/1993 |
| JP | 07-330675 | 8/1995 |
| JP | 07242706 | * 9/1995 |
| JP | 7242706 | 9/1995 |
| JP | 8109215 | 4/1996 |
| JP | 08109215 | * 4/1996 |
| JP | 9165478 | 6/1997 |
| JP | 09176226 | 7/1997 |
| JP | 2000191845 | 7/2000 |
| KR | 1020010084520 | 9/2001 |
| WO | WO 00/73355 | 7/2000 |
| WO | WO 01/32718 | 5/2001 |
| WO | WO 01/78687 | 10/2001 |
| WO | WO 02/38619 | 5/2002 |
| WO | WO 02/38620 | 5/2002 |
| WO | WO 02/38622 | 5/2002 |
| WO | WO 02/38623 | 5/2002 |
| WO | WO 02/38624 | 5/2002 |
| WO | WO 02/48206 | 7/2002 |
| WO | WO 02/051933 | 7/2002 |
| WO | WO 02/051934 | 7/2002 |
| WO | WO 02/052059 | 7/2002 |
| WO | WO 03/000747 | 3/2003 |

OTHER PUBLICATIONS

Stokes et al., "Reactions of Cobaloxime Anions and/or Hydrides with Enynes as a New, General Route to 1, 3– and 1,2–Dienylcobaloxime Complexes," Organometallics, 1996, vol. 15, pp. 2624–2632.

Zhou et al., "Synthesis and Structure of Novel Bridged Dinuclear Indium Complexes," Inorg. Chem., 1996, vol. 35, pp. 1423–1424.

Tinklet et al., "Polymerisation of ethene by the novel titanium complex [Ti(Me3SiNCH2CH2NsiMe3)CI2]; a metallocene analogue," Chem. Commun., 1996, pp. 2623–2624.

Linden et al., "Polymerization of a–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Penoxide Titanium and Zirconium Species," J. Am. Chem. Soc., 1995, vol. 117, pp. 3008–3021.

Zhou et al., "Bulky Amidinate Complexes of Tin(IV). Synthesis and Structure of Sn(RNC(R')NR)2C22 (R = Cyclohexyl, R'= H, Me; R = SiMe3, R'= tBu)," Inorg. Chem., 1997, vol.36, pp. 501–504.

Averbuj et al. "Stereoregulat Polymerization of a–Olefins Catalyzed by Chiral Group 4 Benzamidinate Complexes of C1 and C3 Symmetry" J. Am. Chem. Soc,1998, vol. 120, 8640–8646.

International Search Report PCT/KR00/01521, Sep. 14, 2001.

* cited by examiner

METHOD FOR PREPARING CHELATED CATALYST FOR OLEFIN POLYMERIZATION

BACKGROUND OF THE INVENTION

1. Field of the Invention

The present invention relates to a chelated catalyst for olefin polymerization and a method for olefin polymerization using the chelated catalyst. More particularly, the present invention relates to a chelated catalyst for olefin polymerization, including liquid-phase titanium compounds chelated by an imidazole ligand, and a method for olefin polymerization using the chelated catalyst.

2. Description of the Related Art

Efforts continue to be made to improve the properties of polymers produced by olefin polymerization in which the catalyst contains transition metal compounds. Many of these improvement efforts have focused on changing the reaction environment of the transition metal compound. Considerable advances have been made in controlling the reaction environment of the transition metal compounds by attaching cyclopentadienyl ligands to the transition metal to form metallocene compounds.

In the 1980's, homogeneous catalysts which made use of metallocene compounds drew attention for their ability to produce polymers having improved properties including high impact strength, good transparency, etc. These improved properties resulted from controlled (co) polymerization with α-olefins. Metallocene compounds were synthesized which contained derivatives of the cyclopentadienyl group such as indenyl, cycloheptadienyl, and fluorenyl groups. These cyclopentadienyl derivatives can control the electronic and stereo-spatial environment of the catalyst allowing control of the stereo-regularity and molecular weight of the polymer. The range of use of these catalysts has been expanding.

Recently, efforts have been made to develop catalysts that can produce copolymers with improved properties while also controlling granular morphology of the polymer. These efforts have focused on using heterogeneous catalysts prepared by supporting metallocene compounds on inorganic supports. For example, U.S. Pat. Nos. 5,439,995 and 5,455,316 disclose production of heterogeneous catalysts that produce polymers with excellent granular morphology and copolymer properties using zirconocene or titanocene compounds supported on magnesium or silica compounds. However, complicated organometallic chemical synthesesare typically required to produce metallocene catalysts. In addition, high-cost methylaluminoxane (MAO) or boron compounds are typically required to be used as cocatalysts. Polymers prepared by using metallocene catalysts typically have a narrow molecular weight distribution (Mw/Mn=2–5) making it difficult to process the polymer. As a result, there is a need for improved catalyst compounds that can be easily produced.

Efforts have been made to develop catalysts that can be more easily synthesized by using bidentate or tridentate chelate compounds that can produce a polymer with a narrow molecular weight distribution. Japan Patent Publication Sho 63-191811 discloses the polymerization of ethylene and propylene using a catalyst in which the halide ligand of a titanium halide compound is resplaced with a TPB ligand (6-tert butyl4-methylphenoxy). Using methylaluminoxane as a cocatalyst in the polymerization of ethylene and propylene, it was reported that a high activity catalyst was formed that produced polymers with high molecular weights (average molecular weight of 3,600,000 or more). U.S. Pat. No. 5,134,104 discloses a dioctylamine titanium halide $\{(C_8H_{17})_2NTiCl_3\}$ olefin polymerization catalyst. The amine ligand occupies a large volume and is used to replace a halide ligand of $TiCl_4$. US, J. Am. Chem. Soc. No. 117, p. 3008, discloses an olefin polymerization catalyst that uses a chelated compound to provide stereochemical control of the space around the transition metal, the compound, or its derivative. The catalyst, in this case, is titanium or zirconium chelated with a 1,1'-bi-2,2'-naphthoxy ligand. Japan Patent Publication Hei 6-340711 and European Patent 0606125A2 disclose other chelated olefin polymerization catalysts for producing polymers with high molecular weights and narrow molecular weight distributions. These catalysts are formed by substituting the halide ligand of a titanium or zirconium halide compound with a chelated phenoxy group.

Olefin polymerization catalysts that use a transition metal compound chelated with an amine group have also been disclosed. *Organometallics* 1996, Vol. 15, p. 2672, and *Chem. Commun.*, 1996, p. 2623 describes an olefin polymerization catalyst prepared by synthesizing a titanium compound chelated with various types of diamide compounds. J. Am. Chem. Soc., 1998, Vol. 120, p. 8640 describes a propylene polymerization catalyst using titanium and zirconium compounds chelated with diamide. These chelated compounds use MAO as a cocatalyst. All of these chelated titanium compounds and zirconium compounds were apparently introduced only for their potential use as homogeneous catalysts. No report has been published that describes a non-homogeneous chelated catalyst supported on or activated by an inorganic support in order to improve the granule morphology or copolymer properties of the resulting polymer.

SUMMARY OF THE INVENTION

The object of the present invention is to provide a new catalyst and method for olefin polymerization. The catalyst is a liquid titanium compound chelated with an imidazole ligand that produces a polymer having a narrow molecular weight distribution and homogenous branching in the polymer chain when used as the main catalyst in the presence of a magnesium halide compound and an organometallic aluminum compound.

The present invention relates to a new chelated catalyst for olefin polymerization in which the chelated catalyst may be formed by combining a liquid phase titanium compound with an imidazole chelate ligand and a method for olefin polymerization using the chelated catalyst.

The olefin polymerization catalyst of the present invention may be produced, as shown in reaction scheme (I), by first reacting a compound containing magnesium and aluminum, $Mg[Al(OR)_3R']_2$, (where R and R' are alkyl groups) with an imidazole chelate ligand to obtain a magnesium compound containing a chelate ligand. The resulting magnesium compound containing a chelate ligand may then be reacted with a titanium halide compound to obtain a liquid titanium compound. The liquid titanium compound may then be reacted again with $Mg[Al(OR)_3R']_2$.

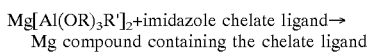
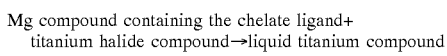
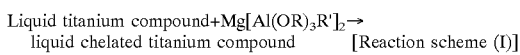

[Reaction scheme (I)]

The compound containing magnesium and aluminum, Mg[Al(OR)$_3$R']$_2$, may be produced by first reacting an organometallic aluminum compound, AlR"$_3$, with alcohol, ROH, to obtain an aluminum alkoxy compound, Al(OR)$_3$. The resulting aluminum alkoxy compound, Al(OR)$_3$, may then be reacted with a Grignard reagent, R'$_2$Mg. The reactions are shown in reaction scheme (II).

AlR"$_3$+3ROH→Al(OR)$_3$+3R"H

R'$_2$Mg+2Al(OR)$_3$→Mg[Al(OR)$_3$R']$_2$   [Reaction scheme (II)]

(where R, R', and R" are alkyl groups)

Since the reaction of AlR"$_3$ with ROH is exothermic, it may be preferable to conduct the reaction at a temperature of about 0° C to about 10° C. while slowly adding the ROH dropwise. After the ROH addition is completed, the reaction preferably continues for an hour or longer at room temperature. The reaction of R'$_2$Mg with Al(OR)$_3$ generates only a slight amount of heat and does not need to be performed at a particularly low temperature.

The preferred organometallic aluminum compounds, AlR"$_3$, include triethylaluminum, trimethylaluminum, triisobutylaluminum, trioctylaluminum, or the like. Suitable alcohols, ROH, include alcohols with six or more carbons in the alkyl group. A heavier alcohol allows better control over the heat of reaction. Preferred Grignard compounds, R'$_2$Mg, include dibutylmagnesium, butylethylmagnesium, butyloctylmagnesium, or the like. The reaction of the Grignard reagent with the aluminum alkoxy compound, as shown in reaction scheme (II), occurs readily and may be conducted at room temperature. The preferred reaction solvents include aliphatic hydrocarbons such as hexane, heptane, and the like.

As shown in reaction scheme (I), a magnesium compound containing a chelate ligand may be produced by reacting the compound containing magnesium and aluminum, Mg[Al(OR)$_3$R']$_2$, produced by reaction scheme (II) with an imidazole chelate ligand.

Since the imidazole chelate ligand is not soluble in nonpolar solvents such as hexane, the chelate ligand may be dissolved in a solvent containing an ester group such as THF. The reaction between the imidazole chelate ligand and Mg[Al(OR)$_3$R']$_2$ occurs readily and may preferably be performed under mild reaction conditions in a temperature range from about room temperature to about 50° C. The molar ratio of magnesium compound to imidazole chelate ligand for the reaction is preferably about 1:1 to about 1:1.5, and more preferably, about 1:1.1. Although the reaction may be complete in about one hour, the reaction may be allowed to continue for up to about three hours.

The preferred imidazole chelate ligands include compounds such as benzimidazole, imidazole, benzotriazole, gramine, or the like, including their derivatives.

The liquid-phase titanium compound may be produced by reacting the chelate ligand-containing magnesium compound with a titanium halide compound. The titanium halide compound may first be carefully pre-reacted with THF in order to prevent a violent reaction with the THF used as a solvent for the imidazole ligand. The compounds may be reacted by adding the chelate ligandcontaining magnesium compound to the titanium halide compound solution dropwise at about room temperature and then allowing the reaction to continue for about one hour or more at a temperature of about 65° C. to about 70° C. For this reaction step, the appropriate molar ratio of magnesium to titanium may be about 1:1 to about 1:1.1. The liquid-phase titanium compound thus prepared is not soluble in nonpolar solvents such as hexane but is soluble in polar solvents such as ethers.

However, it is possible to prepare a liquid-phase titanium compound that is soluble in nonpolar solvents. The previously prepared liquid-phase titanium compound may be reacted again with Mg[Al(OR)$_3$R']$_2$ at a molar ratio of about 1:1. At room temperature, the reaction is allowed to continue for more than about 3 hours or at a temperature of about 40 to 50° C., the reaction may be allowed to continue for more than about 1 hour. After the reaction is completed, the solvent is removed by reducing the pressure. A nonpolar solvent such as hexane is then added to the solid component. Solid components that are not soluble in the nonpolar solvent are isolated and removed.

Suitable titanium halide compounds are those having at least two or more halide groups such as TiCl$_4$, TiBr$_4$, TiCl$_2$(OR)$_2$, TiCl$_3$(OR), TiBr$_2$(OR)$_2$, or TiBr$_3$(OR) (where R is an alkyl or aryl group). Suitable electron donors include ethers such as diethylether, dibutyl ether, and tetrahydrofuran (THF) with THF being the preferred electron donor.

The olefin polymerization method according to the present invention may be performed by combining the liquid titanium compound chelated with an imidazole chelate ligand described above with a cocatalyst and an inorganic compound containing a magnesium halide.

An organometallic aluminum compound, R$_n$AlX$_{3-n}$ (where R is an alkyl group, X is a halogen, and n=1, 2, or 3), may be used as a cocatalyst component. The liquid-phase chelated titanium catalyst of the present invention does not form a precipitate by a reduction reaction with the organometallic aluminum compound cocatalyst.

A solid inorganic silica compound having well-defined particles may be used to support the magnesium halide used in the polymerization method of the present invention. Methods to produce this type of compound are well known. For example, a solution of a magnesium halide compound in a hydrocarbon solvent may first be formed. The magnesium halide solution may then be reacted with a compound that can react with an alkoxy group of alcohol on the surface of the silica in the presence of an electron donor such as an alcohol or the like. The alcohol on the surface of the silica is removed in the reaction and a solid magnesium halide precipitates on the surface of silica. U.S. Pat. No. 5,155,078 discloses a method for production of silica containing a magnesium halide. A silica support (F952) is prepared by drying at 200° C. for six hours or longer. The surface of the silica is then coated with an aluminum compound capable of reduction by reacting the silica with an alkylaluminum compound. The treated silica is then reacted with a magnesium halide dissolved in a solution of alcohol and hydrocarbon. The aluminum compound capable of reduction reacts with the alcohol producing a solid magnesium halide on the surface of the silica. The silica-supported magnesium halide may also be produced by reacting a Grignard compound with an alkyl halide or silicon halide in the presence of a silica compound. The resulting magnesium halide compound will be contained on the surface of silica.

According to the method for olefin polymerization of the present invention, a liquid-phase titanium compound, activated in advance by mixing the liquid-phase chelated titanium compound with a cocatalyst component, may be used for the polymerization of olefin in the presence of an inorganic compound component containing a magnesium halide. According to the present invention, when the liquid-phase chelated titanium compound is mixed with the cocatalyst, the chelated titanium compound solution changes from red in color to green by a reduction reaction; however, particulates are not typically formed.

The morphology of the polymer produced using the olefin polymerization catalyst of the present invention may be determined by the morphology of the inorganic compound containing a magnesium halide. For example, when Sylopol 5550 (produced by Grace Davison), which exhibits a well-defined granular morphology, is used in the olefin polymerization, it may be possible to produce a polymer having a bulk density of about 0.37–0.40 g/cm$^3$ with a spherical shape.

It may be possible to obtain a much higher polymerization activity if the magnesium on the surface of the silica is activated by reaction with a certain amount of cocatalyst component prior to being added to the polymerization mixture. The preferred cocatalyst is an organometallic aluminum compound, $R_nAlX_{3-n}$ (where R is an alkyl group, X is a halogen, and n=1, 2, or 3). An acceptable molar ratio of Al to Ti in the main catalyst may be from about 10 to about 50 and the polymerization temperature is preferably from about 40 to about 90° C.

The olefin polymerization catalyst of the present invention may be used for polymerization of ethylene and copolymerization of ethylene with α-olefins, preferably α-olefins having 3 to 10 carbons. α-olefins suitable for copolymerization with ethylene include propylene, 1-butene, 1-pentene, 1-hexene, 4-methyl-1-pentene, and 1-octene. The amount of ethylene in the copolymer is preferably at least about 70% by weight or more.

The olefin polymerization catalyst of the present invention may be used for either slurry or gas-phase polymerization. Molecular weight of the polymer may be varied by adjusting reaction temperature, pressures of olefin and/or hydrogen in the reaction, etc. The polymer may be a branched polyethylene copolymer with a density of about 0.900 to 0.960 g/cm$^3$ and a narrow molecular weight distribution.

DETAILED DESCRIPTION OF THE PREFERRED EMBODIMENTS

The present invention is described in further detail by the examples below.

Water was removed from the hydrocarbon solvents by distillation in the presence of sodium. Water was removed from the halogenated hydrocarbons by distillation in the presence of calcium hydride. All reactions for the production of the catalyst were performed in a nitrogen atmosphere.

EXAMPLE 1

[Production of Titanium Compound Chelated with Benzimidazole]

400 mmol AlEt$_3$ (triethylaluminum) was diluted with hexane to a total volume of 400 ml and poured into a 1-liter flask. The flask was maintained at room temperature with cooling water. 1,200 mmol 2-ethyl hexanol was then slowly added dropwise over the course of an hour producing a colorless, transparent solution. During the addition, the formation of gas was observed. After the addition, the solution was stirred at room temperature for one hour to complete the reaction. 200 ml of a 1.0M butyloctylmagnesium solution in heptane was then added followed by stirring for one hour to produce 680 ml of a solution of Mg[Al(OR)$_3$R']$_2$ (680 ml) (where R=ethylhexyl group, R'=butyloctyl group).

5.92 g benzimidazole (50 mmol) was added to a 1-liter flask and dissolved in 100 ml THF. 170 ml of the Mg[Al(OR)$_3$R']$_2$ solution was then added followed by stirring at 40° C. for one hour to obtain a magnesium compound (A) containing an imidazole ligand.

Compound (A) was then reacted with 16.7 g TiCl$_4$(THF)$_2$ at 40° C. for one hour producing titanium compound (B) which was red in color. 170 ml Mg[Al(OR)$_3$R']$_2$ was added to this solution followed by stirring at 50° C. for three hours forming a red solution. The solvent was then removed by reducing the pressure. After the solvent was removed, 500 ml hexane was added and the solution was stirred at room temperature for 6 hours. Stirring was halted and the solution was allowed to sit for 20 minutes allowing a white precipitate to settle to the bottom of the flask. The red solution in the upper layer was then separated from the white precipitate and placed in another flask. The solution was used as the main catalyst for the polymerization reaction.

[Ethylene Polymerization Reaction]

A 2-liter autoclave was completely purged with nitrogen followed by the addition of 1000 ml hexane at room temperature. The nitrogen in the autoclave was then replaced with ethylene. 5 ml of the main catalyst produced above was reacted with 5 mmol AlEt$_3$ at room temperature for 30 minutes. The resulting solution was added to the contents of the autoclave. After the addition, no formation of precipitate was observed. 0.5 g Sylopol 5550 (silica containing magnesium halide, produced by Grace Davison) was reacted with 2.5 mmol AlOct$_3$ (trioctylaluminum) in a separate flask for one hour and then injected into the autoclave. 1 kg/cm$^2$·G hydrogen at 60° C. was added to the autoclave. The pressure was then increased to 6kg/cm$^2$·G with ethylene. The temperature was increased to 70° C. and the polymerization reaction was allowed to continue for one hour. The polymer product was separated from the hexane and dried providing 150 g of polyethylene. The polymer had a narrow molecular weight distribution, a melt index of 0.5 g/10 min, and an MFRR of 24.1. Results are presented in the Table 1.

[Copolymerization of Ethylene/1-hexene]

A 2-liter autoclave was evacuated with a vacuum pump and then filled with ethylene. The autoclave was evacuated again followed by refilling with ethylene. This procedure was repeated twice more. 900 ml hexane was added to the autoclave followed by the addition of 90 ml 1-hexene. The mixture was stirred for 10 minutes. 5 ml of the above-described main catalyst was reacted with 5 mmol of AlEt$_3$ at room temperature for 30 minutes to form a green solution that was then added to the autoclave. After the addition, no formation of precipitate occurred. 0.5 g Sylopol 5550 was reacted with 2.5 mmol AlOct$_3$ (trioctylaluminum) in a separate flask for one hour and then added to the autoclave. 1 kg/cm$^2$·G hydrogen at 60° C. was added to the autoclave and the pressure was raised to 7 kg/cm$^2$·G with ethylene. The temperature was raised to 85° C. and the polymerization reaction was allowed to continue for 30 minutes. After 30 minutes, an ethanol solution was injected into the autoclave to terminate the reaction. An acidic alcohol solution was then added to the autoclave to separate out the polymer product. The melt index of the polymer was 0.45 with an MFRR of 23.1. Complete results are shown in Table 2. The low MFRR value indicates a narrow molecular weight distribution and the low melting point indicates an even distribution of comonomer throughout the polymer.

EXAMPLE 2

The method described in Example 1 was used to synthesize a titanium catalyst chelated with imidazole in place of the benzimidazole. The polymerization and copolymerization reactions were performed in the same way as described in Example 1. Results of the polymerization are shown in Table 1. Results of the copolymerization are shown in Table 2.

EXAMPLE 3

The method described in Example 1 was used to synthesize a titanium catalyst chelated with benzotriazole in place of the benzimidazole. The polymerization and copolymerization reactions were performed in the same way as described in Example 1. Results of the polymerization are shown in Table 1. Results of the copolymerization are shown in Table 2.

EXAMPLE 4

The method described in Example 1 was used to synthesize a titanium catalyst chelated with gramine in place of the benzimidazole. The polymerization and copolymerization reactions were performed in the same way as described in Example 1. Results of the polymerization are shown in Table 1. Results of the copolymerization are shown in Table 2.

COMPARATIVE EXAMPLE 1

[Production of Liquid Titanium Compound]

100 mmol AlEt$_3$ was diluted with hexane to a total volume of 100 ml in a 1-liter flask and maintained at room temperature with cooling water. 300 mmol 2-ethyl hexanol was added dropwise to the flask over the course of an hour to produce a colorless, transparent solution. During the addition, the generation of gas was observed. After the addition was completed, the solution was stirred at room temperature for one hour. 50 ml of a 1.0M butyloctyl magnesium solution in heptane was added to the flask and stirred for one hour to produce Mg[Al(OR)$_3$R']$_2$ (R=ethylhexyl, R'=butyloctyl). The solution containing Mg[Al(OR)$_3$R']$_2$ was reacted with 16.7 g TiCl$_4$(THF)$_2$ (50 mmol) at room temperature for six hours. During the reaction, the solid, light yellow TiCl4(THF)$_2$ gradually turned brown and a white solid magnesium halide was formed. Stirring was stopped after six hours and the solution was allowed to stand for 20 minutes allowing the white precipitate to settle to the bottom of the flask. The brown liquid in the upper part of the flask was then separated from the white precipitate and used as the liquid titanium compound.

[Ethylene Polymerization Reaction]

The ethylene polymerization and copolymerization reactions were performed using the method of Example 1 except that the liquid phase titanium compound component described above was used. The results of the polymerizations are shown in Tables 1 and 2.

TABLE 1

| | Chelate Ligand | Activity[1] | MI[2] | MFRR[3] | Bulk Density (g/cm$^3$) |
|---|---|---|---|---|---|
| Example 1 | Benzimidazole | 300 | 0.7 | 24.3 | 0.42 |
| Example 2 | Imidazole | 260 | 0.5 | 25.2 | 0.42 |
| Example 3 | Benzotriazole | 320 | 0.6 | 26.3 | 0.41 |
| Example 4 | Gramine | 380 | 0.8 | 24.1 | 0.41 |
| Comparative Example | — | 400 | 0.6 | 29.3 | 0.37 |

[1] unit of activity = g – PE/mmol – Ti · hr
[2] 2.16 kg/10 min.
[3] Ratio of Melt Index(21.6 kg/2.16 kg, 10 min)

TABLE 2

| | Chelate Ligand | Activity[1] | MI[2] | MFRR[3] | Content of C6 in polymer | Δ H(J/g) | Tm(° C.) |
|---|---|---|---|---|---|---|---|
| Example 1 | Benzimidazole | 300 | 1.2 | 24.3 | 7.0 | 97 | 121.3 |
| Example 2 | Imidazole | 260 | 1.5 | 23.2 | 7.2 | 98 | 122.1 |
| Example 3 | Benzotriazole | 320 | 1.6 | 24.3 | 7.3 | 95 | 121.3 |
| Example 4 | Gramine | 380 | 0.8 | 23.1 | 6.9 | 99 | 123.3 |
| Comparative Example | — | 400 | 1.2 | 29.3 | 7.3 | 94 | 125 |

[1] unit of activity = g – PE/mmol – Ti · hr
[2] 2.16 kg/10 min
[3] Ratio of Melt Index(21.6 kg/2.16 kg, 10 min)

As shown in Tables 1 and 2, the polymers prepared according to the present invention exhibit smaller MFRR values (23–25) than Comparative Example 1 (29) indicating a more narrow molecular weight distribution. Moreover, the melting points, $T_m$, of copolymer in Examples 1–4 (121–123° C.) are lower than the melting point of the copolymer in Comparative Example 1 (125° C) indicating that branching in the polymer is more homogeneously distributed.

As described above, using the catalyst for olefin polymerization of the present invention produces polymers with a narrow molecular weight distribution containing branching in the polymer chain.

What is claimed is:

1. A method for preparing, chelated catalyst in a liquid state for olefin polymerization comprising:

producing a magnesium compound containing a chelated ligand by reacting an imidazole chelate ligand with Mg[Al(OR)$_3$R']$_2$ wherein R and R' comprise alkyl groups;

producing a titanium compound in a liquid state by reacting the magnesium compound with a titanium halide compound; and preparing the chelated catalyst by reacting the titanium compound in a liquid state with Mg[Al(OR)$_3$R']$_2$, wherein R and R' comprise alkyl groups.

2. The method of claim 1, wherein the chelated ligand is benzimidazole, imidazole, benzotriazole, gramine, or derivatives thereof.

* * * * *